(12) United States Patent
Schachinger et al.

(10) Patent No.: US 12,344,914 B2
(45) Date of Patent: Jul. 1, 2025

(54) METHOD FOR PRODUCING HARDENED STEEL COMPONENTS WITH A CONDITIONED ZINC ALLOY ANTI-CORROSIVE LAYER

(71) Applicant: VOESTALPINE STAHL GMBH, Linz (AT)

(72) Inventors: Ernst Schachinger, Linz (AT); Martin Fleischanderl, Rainbach i.M. (AT)

(73) Assignee: Voestalpine Stahl GmbH, Linz (AT)

(*) Notice: Subject to any disclaimer, the term of this patent is extended or adjusted under 35 U.S.C. 154(b) by 0 days.

(21) Appl. No.: 17/802,596

(22) PCT Filed: Mar. 1, 2021

(86) PCT No.: PCT/EP2021/054965
§ 371 (c)(1),
(2) Date: Aug. 26, 2022

(87) PCT Pub. No.: WO2021/170862
PCT Pub. Date: Sep. 2, 2021

(65) Prior Publication Data
US 2023/0183832 A1    Jun. 15, 2023

(30) Foreign Application Priority Data
Feb. 28, 2020   (EP) .................................. 20160199

(51) Int. Cl.
C23C 2/02   (2006.01)
B32B 15/01   (2006.01)
(Continued)

(52) U.S. Cl.
CPC .............. *C21D 9/46* (2013.01); *B32B 15/013* (2013.01); *C21D 1/18* (2013.01); *C21D 8/0205* (2013.01);
(Continued)

(58) Field of Classification Search
None
See application file for complete search history.

(56) References Cited

U.S. PATENT DOCUMENTS 3,869,261 A    3/1975   Katsuma
4,278,477 A *  7/1981   Reinhold ................ C23C 22/83
                                                    106/14.12
(Continued)

FOREIGN PATENT DOCUMENTS

DE    102007022174 B3   9/2008
DE    102010037077 B4   3/2014
(Continued)

OTHER PUBLICATIONS

International Search Report and Written Opinion for PCT/EP2021/054965, dated May 4, 2021.

*Primary Examiner* — David P Turocy
(74) *Attorney, Agent, or Firm* — Maxwell J. Petersen; FisherBroyles, LLP

(57) ABSTRACT

A method for producing hardened steel components is provided. Sheet bars are cut out from an alloy-galvanized strip made of a hardenable steel alloy and the sheet bars are heated to a temperature that produces a structural change to austenite, preferably to a temperature above the respective Ac3 point. The austenitized sheet bars are then conveyed to a press hardening tool in which the sheet bars are hot formed in a single stroke or multiple strokes by means of an upper and lower tool, wherein the formed sheet bar is cooled against the tools at a speed above the critical cooling rate so that a martensitic hardening occurs. After the galvanization, which can be hot-dip galvanization of the steel strip and before the temperature increase for achieving the austenitization, tin is applied to the surface of the strip or sheet bar.

22 Claims, 13 Drawing Sheets

(51) Int. Cl.
  *C21D 1/18* (2006.01)
  *C21D 8/02* (2006.01)
  *C21D 9/46* (2006.01)
  *C23C 2/26* (2006.01)
  *C23C 2/28* (2006.01)

(52) U.S. Cl.
  CPC ......... *C21D 8/0221* (2013.01); *C21D 8/0247* (2013.01); *C23C 2/26* (2013.01); *C23C 2/28* (2013.01); *C23C 2/29* (2022.08); *C21D 2211/008* (2013.01)

(56) References Cited

U.S. PATENT DOCUMENTS

| | | | | |
|---|---|---|---|---|
| 4,927,472 | A | * | 5/1990 | Matsushima ........... C25D 11/36 148/261 |
| 5,562,950 | A | * | 10/1996 | Dailey ................... C23C 18/31 427/443.1 |
| 2003/0034095 | A1 | | 2/2003 | Heimann et al. |
| 2010/0209732 | A1 | * | 8/2010 | Hackbarth ............ C23C 28/025 148/253 |

FOREIGN PATENT DOCUMENTS

| | | | | |
|---|---|---|---|---|
| EP | 1362932 | A1 | | 11/2003 |
| EP | 1630244 | B1 | | 3/2006 |
| EP | 2536857 | B1 | | 12/2012 |
| JP | 2016176101 | A | * | 10/2016 |
| WO | WO-2014012703 | A1 | * | 1/2014 ............. C23C 22/23 |
| WO | WO-2017060763 | A1 | * | 4/2017 ........... B21D 22/022 |
| WO | 2018126471 | A1 | | 7/2018 |

* cited by examiner

Fig. 7 According to the invention

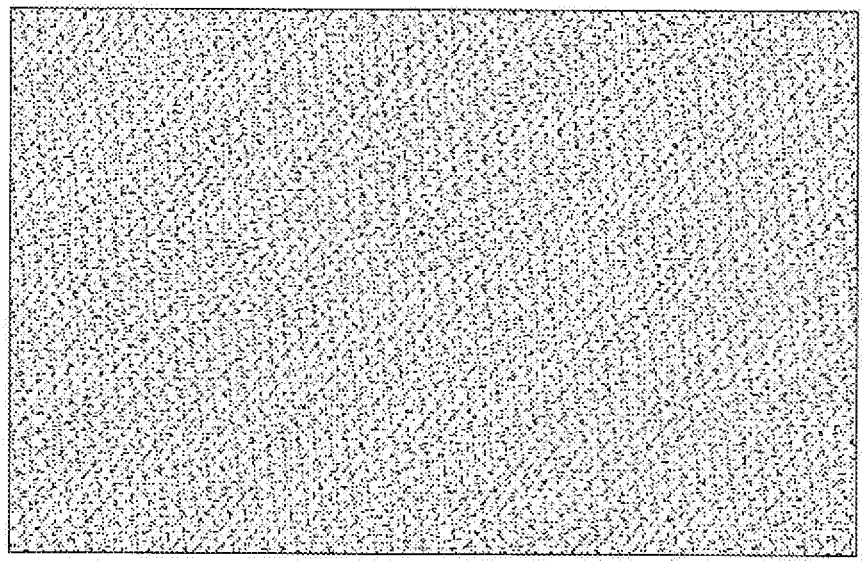
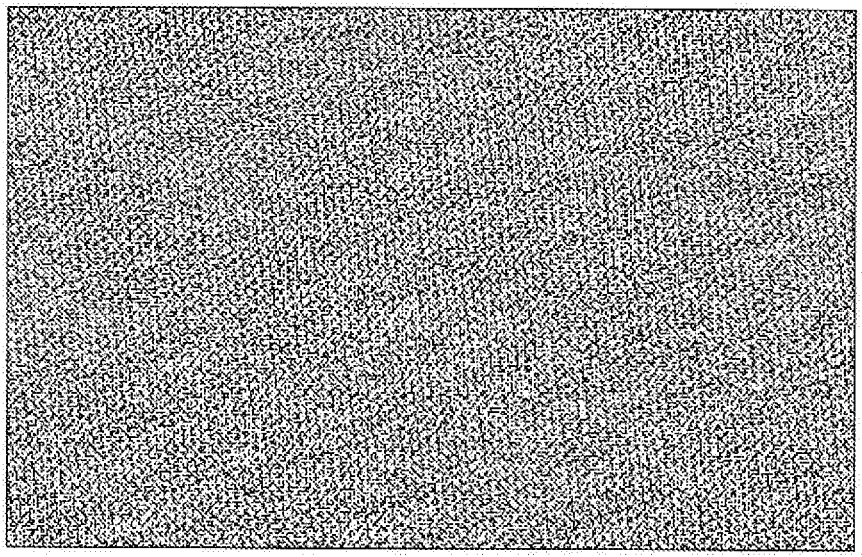
Fig. 8

Resistance results

| Type | Surface resistance [mOhm] | Standard deviation [mOhm] |
|---|---|---|
| phs-ultraform 22MnB5, Z140, 200s | 1.4 | 0.25 |
| phs-ultraform 22MnB5, Z140, 45s | 0.4 | 0.15 |
| 340LAD, Z180, 200s | 0.2 | 0.04 |
| 340LAD, Z180, 45s | 0.2 | 0.05 |
| phs-directform 20MnB8, ZF180 200s | 0.4 | 0.10 |
| phs-directform 20MnB8, ZF180 45s | 0.2 | 0.07 |

Fig. 12

Paint infiltration after 6 weeks VDA-old strain on sample scratched down to steel

| Type | Sample | Paint infiltration [mm] | Paint infiltration [mm] | Cross-hatch adhesion value |
|---|---|---|---|---|
| phs-ultraform 22MnB5, Z140 | 45s | 0.6 | 1.0 | 0//1 |
|  | 200s | 0.05 | 0.05 | 0 |
| 340LAD, Z180 | 45s | 0.7 | 0.9 | 0//1 |
|  | 200s | 0.5 | 0.6 | 1//2 |
| phs-directform 20MnB8, ZF180 | 45s | 0.1 | 0.1 | 0//0 |
|  | 200s | 0.1 | 0.1 | 0//0 |

// After test

Fig. 13

METHOD FOR PRODUCING HARDENED STEEL COMPONENTS WITH A CONDITIONED ZINC ALLOY ANTI-CORROSIVE LAYER

RELATED APPLICATIONS

This patent application is a 35 U.S.C. § 371 National Stage entry of PCT/EP2021/054965, filed Mar. 1, 2021, which in turn claims priority based on European Patent Application EP20160199.4, filed on Feb. 28, 2020, the disclosures of which are incorporated herein by reference.

FIELD OF THE INVENTION

The invention relates to a method for producing hardened steel components with a conditioned zinc alloy corrosion protection layer.

BACKGROUND OF THE INVENTION

It has long been known to provide protection layers for metallic sheets, in particular metallic strips, which could corrode under normal conditions of use.

In general, corrosion protection layers on metal strips can be organic coatings such as paints; these paints can easily also contain corrosion-inhibiting agents.

It is also known to protect metal strips by means of metal coatings. Such metal coatings can consist of an electrochemically more noble metal or of an electrochemically more base metal.

In the case of a coating composed of an electrochemically more noble metal or a metal that is self-passivating such as aluminum, one speaks of a barrier protection layer; for example when aluminum is applied to steel, the steel material then suffers from corrosion if this barrier protection layer is no longer present in some places, for example due to mechanical damage. A common barrier protection layer for steel is the above-mentioned aluminum layer, which is usually applied by means of hot-dip coating.

If an electrochemically more base metal is applied as a protection layer, one speaks of a cathodic anti-corrosion coating because if the corrosion protection coating suffers a mechanical injury down to the steel material, the electrochemically more base metal is corroded first before the steel material itself is subjected to the corrosion.

The most commonly used cathodic protection coating on steel is a zinc coating or a zinc-based alloy.

There are various known galvanization methods. A common galvanization method is the so-called hot-dip galvanization (also known as batch galvanization). In this case, steel is dipped continuously (e.g. strip or wire) or by the piece (e.g. components or sheet bars) at temperatures of about 450° C. to 600° C. into a bath of molten zinc (the melting point of zinc is 419.5° C.). The zinc bath conventionally contains at least 98.0 wt % zinc according to DIN EN ISO 1461. On the steel surface, a tough alloy layer of iron and zinc forms that is covered by a firmly adhering pure zinc layer whose composition corresponds to that of the zinc bath. In a continuously galvanized strip, the zinc layer has a thickness of 5 µm to 40 µm. In a component that is galvanized by the piece, the zinc layer can have thicknesses of 50 µm to 150 µm.

With an electrolytic galvanization (galvanic zinc plating), steel strips or steel plates are immersed not in a zinc bath, but rather in a zinc electrolyte. In this case, the steel that is to be galvanized is introduced into the solution as a cathode and an electrode composed of the purest possible zinc or of an electrolyte with a high quantity of dissolved zinc is used as an anode. Electrical current is conducted through the electrolyte solution. In this case, the zinc that is present in ionic form (oxidation stage+II) is reduced to metallic zinc and is deposited onto the steel surface. In comparison to hot-dip galvanization, thinner zinc layers can be deposited with electrolytic galvanization. The zinc layer thickness in this case is proportional to the intensity and duration of the current flow, wherein—depending on the geometry of the workpiece and anode—a layer thickness distribution across the entire workpiece is produced.

Insuring the adhesion to the zinc layer requires a careful pretreatment of the surface. For example, this can be degreasing, alkaline cleaning, flushing, and/or descaling. After the galvanization, one or more aftertreatments can be performed, for example phosphating, oiling, or application of organic coatings (e.g. cataphoretic immersion painting—CIP).

Usually, this involves the depositing of not just pure metal coatings. There are also numerous known alloys that are deposited; in addition to pure aluminum coatings there are also coatings that contain aluminum and zinc and coatings that, in addition to the zinc that they predominantly contain, also contain small quantities of aluminum; other elements can also be contained, for example zinc, nickel, chromium, magnesium, and other elements as well as mixtures thereof. Whenever zinc corrosion protection layers or galvanized steel strip is mentioned in the application, these also include zinc-based alloys.

It has also long been known, particularly for purposes of reducing the weight of vehicle bodies, to embody at least parts of vehicle bodies with a high strength in order to ensure a sufficient strength in the event of a crash. The weight savings are achieved by virtue of the fact that high-strength steel grades can be used with comparatively thin wall thicknesses and therefore have a low weight.

Even when using high-strength steel grades, there are different approaches and an extremely wide variety of steel grades that can be used.

It is especially common to use steel grades that are high-strength due to quench hardening. Quench hardening means that a cooling rate above the critical cooling rate is selected. The latter is approximately 15° to 25° Kelvin per second, but can also be lower depending on the alloy composition. Common steel grades that can be hardened by means of quench hardening are the so-called boron-manganese steels, for example 22MnB5 which is the most commonly used, but also variants of this steel such as 20MnB8 and 30MnB8. Non-hardenable steels such as microalloyed steel can also be hot-formed using the direct or indirect process.

Steel grades of this kind can be easily shaped and cut to size in the unhardened state.

There are essentially two different procedures, particularly in vehicle body construction, for bringing such steel grades into the desired shape and hardening them.

The first, somewhat older procedure is what is known as press hardening. In press hardening, a flat sheet bar is cut out from a sheet steel strip made of a quench-hardenable steel alloy such as a 22MnB5 or a similar manganese-boron steel. This flat sheet bar is then heated to such an extent that the steel structure is in the form of gamma iron or austenite. In order to achieve this structure, it is thus necessary to exceed the so-called austenitization temperature $Ac_3$, at least if a complete austenitization is desired.

Depending on the steel, this temperature can be between 820° C. and 900° C.; for example, such steel sheet bars are heated to about 900° C. to 930° C. and are kept at this temperature until the structural change is complete.

Such a steel sheet bar is then transferred in the hot state to a press in which by means of an upper tool and a lower tool that are each correspondingly shaped, the hot steel sheet bar is brought into the desired shape with a single press stroke. Through the contact of the hot steel material with the comparatively cool, in particular cooled, press tools, i.e. forming tools, energy is removed from the steel very quickly. In particular, the heat must be removed quickly enough that the so-called critical hardening speed is exceeded, which is usually between 20° and 25° Kelvin per second.

If cooling is carried out at such a speed, then the structure of the austenite does not change back into a ferritic initial structure; instead, a martensitic structure is achieved. Due to the fact that austenite can dissolve significantly more carbon in its structure than martensite, carbon precipitation phenomena cause lattice distortion, which results in the high hardness of the end product. The rapid cooling stabilizes the martensitic state, so to speak. This makes it possible to achieve hardnesses and tensile strengths $R_m$ of greater than 1500 MPa. It is also possible to establish hardness profiles by means of suitable measures that need not be discussed in greater detail, for example complete or partial reheating.

An additional, somewhat newer way to produce hardened steel components, particularly for vehicle body construction, is form hardening, which was developed by the applicant. In form hardening, a flat steel sheet bar is cut out from a steel strip and this flat steel sheet bar is then formed in the cold state. In particular, this forming takes place not with a single press stroke, but rather—as is customary in conventional press lines—for example in a five-step process. This process enables production of significantly more complex shapes so that it is possible in the end to produce a complexly shaped component such as a B-pillar or a longitudinal member of a motor vehicle.

In order to then harden such a fully formed component, this component is likewise austenitized in a furnace and in the austenitized state, is transferred into a forming tool, said forming tool having the contour of the final component. Preferably, the pre-formed component is shaped before the heating in such a way that after the heating and thus also after a thermal expansion has taken place, this component already corresponds as much as possible to the final dimensions of the hardened component. This austenitized blank is placed into the forming tool in the austenitized state and the forming tool is closed. In this case, the component is preferably touched by the forming tool on all sides and held in a clamped fashion and, by means of the contact with the forming tool, the heat is likewise removed in such a way that a martensitic structure is produced.

In the clamped state, shrinkage cannot take place so that the hardened final component with the corresponding final dimensions can be removed from the forming tool after the hardening and cooling.

Since motor vehicle bodies customarily have a corrosion protection coating, with the corrosion protection layer the closest to the metal material of which the vehicle body is composed—in particular steel—being embodied in the form of a metallic coating, past efforts and development have focused on corrosion protection coatings for hardened components.

Corrosion protection coatings for components that are to be hardened, however, have to satisfy different requirements than corrosion protection coatings of components that are not hardened. The corrosion protection coatings must be able to withstand the high temperatures that are produced during hardening. Since it has long been known that hot-dip aluminized coatings can also withstand high temperatures, press-hardening steels with a protection layer of aluminum were developed first. Such coatings are able to withstand not only the high temperatures, but also the forming in the hot state. It is disadvantageous, however, that usually in motor vehicles, conventional steel grades are used that undergo not hot-dip aluminizing procedures, but rather hot-dip galvanizing procedures and it is fundamentally problematic to use different corrosion-protection systems, particularly when there is a risk of contact corrosion.

For this reason, the applicant has developed methods that make it possible to provide zinc coatings, which likewise resist such high temperatures.

Basically, zinc coatings are much less complicated than aluminum coatings when it comes to forming since aluminum coatings tend to flake off or crack at conventional forming temperatures. This does not happen with zinc.

Initially, though, zinc coatings were not expected to be able to withstand the high temperatures. But special zinc coatings that contain a certain amount of elements with an affinity for oxygen can in fact also be processed at high temperatures because the elements with an affinity for oxygen diffuse quickly to the surface on the air side where they oxidize and form an oxide layer on the zinc coating. In the time since, such zinc coatings have come into widespread use, particularly for form hardening. Zinc coatings of this kind have also been used with great success in press hardening.

In order to ensure optimal paint adhesion, low paint infiltration in the course of corrosion processes, and optimal weldability, it is known to clean the finally formed and hardened components in such a way that the protective oxide layer is evened out or abraded.

DE 10 2010 037 077 B4 has disclosed a method for conditioning the surface of hardened corrosion-protected components made of sheet steel in which the sheet steel is a sheet steel with a metallic coating that is heated for the hardening and then quench-hardened. After the hardening, the oxides that are present on the corrosion protection coating due to the heating are removed, wherein for conditioning the surface of the metallic coating, i.e. the corrosion protection layer, the component undergoes a slide grinding, and wherein the corrosion protection coating is a zinc-based coating and the surface conditioning is carried out in such a way that oxides that are present on or adhering to the corrosion-protection layer are ground away and in particular, a micro-porosity is exposed.

DE 10 2007 022 174 B3 has disclosed a method for producing and removing a temporary protection layer for a cathodic coating, wherein a sheet steel composed of a hardenable steel alloy is provided with a zinc coating in the hot-dip immersion process, wherein the aluminum content in the zinc bath is adjusted so that during the melt hardening, a superficial oxide skin of aluminum oxide forms, wherein after the hardening, this thin skin is blasted away by blasting the sheet metal component with dry ice particles.

Another alternative for removing or conditioning the oxide layer is what is known as wheel blasting in which the strip is blasted with abrasive particles, with the oxide layer being blasted away and evened out by means of the particles. An example of this is EP 1 630 244 B1.

Protective layers of this kind usually occur only with zinc coatings, whereas aluminum coatings often do not require any cleaning or require only a less laborious cleaning.

WO 2018/126471 A1 has disclosed a sol-gel preconditioning of the layer for reducing the oxide layer formation and increasing weldability. The intent of this is to produce an oxidation protection coating for press-hardened steel materials, based on silane-containing and titanium-containing bonding agents and oxidic pigments, which are clearly deposited in the sol-gel process. In particular, solvents such as methanol are used here, which cannot be used in steel production lines. After the press hardening, the coating is supposed to fall off on its own, but tests with titanium-based and silicon-based coatings were carried out in 2015/16 and were not successful with either a thick or thin wet film. The coating does not fall off on its own and the weldability is also not suitable for industrial applications.

EP 2 536 857 B1 has disclosed a ceramic-based coating with a thickness 25 μm, which should essentially consist of $SiO_2$, $Al_2O_2$, and MgO, with metallic fibers made of tin being included where necessary. It is, however, known from the literature that a high concentration of $SiO_2$ can result in a lack of weldability.

SUMMARY OF THE INVENTION

The object of the invention is to create a method for producing hardened steel components in which an existing zinc alloy corrosion protection layer is conditioned in such a way that it is possible to dispense with a blast cleaning (conditioning of the component surface by means of blasting material, slide grinding, or the like) after the hardening.

The object is attained with a method having the features described and claimed herein.

Advantageous modifications are also described and claimed herein.

Another object is to create a galvanized steel strip, which is constituted in such a way that it is possible to dispense with the cleaning of the oxide layer.

The object is attained with an alloy-galvanized steel strip having the features described and claimed herein.

Advantageous modifications are also described and claimed herein.

The invention is based on the realization that under certain circumstances, it is possible to dispense with a cleaning of the surface of a metal strip that is galvanized and has been subjected to a temperature increase in order to produce a structural change. In particular, it is possible to dispense with the mechanical cleaning of a galvanized sheet steel and of a hardened component that is produced from it.

A cleaning aftertreatment is indeed a controllable and well-established process, but it does create a larger amount of work. In addition, there is a risk of additional surface defects, which can incur higher overall costs. With very thin components, it has turned out that under certain circumstances, the dimensional accuracy of the components can be reduced.

If there are interconnected process sequences, which require these cleaning steps to be arranged inline within an overall production process, then it may be necessary to adjust the cycle time.

According to the invention, it has turned out that the phosphatability, paintability, and weldability can be successfully adjusted by means of a surface treatment of the galvanized surface before the hot-forming process. According to the invention, the oxide growth during the hardening process can be embodied in such a way that it is unnecessary to perform a subsequent mechanical surface conditioning such as centrifugal blasting, slide grinding, or dry ice blasting.

According to the invention, it has surprisingly turned out that certain aqueous salt solutions of tin such as salt solutions, which preferably include stannates, but also oxalates, zirconates, and titanates, clearly modify the oxide skin in such a way that it is not necessary to perform a cleaning of any kind whatsoever.

In particular and surprisingly, it has turned out that stannates or metallic tin are especially effective in this regard.

This is even more surprising because zinc alloy-coated sheet metals in the annealed state are usually not phosphatable enough.

The term "stannates" includes the salts of stannic acids (II) and (IV).

Stannates (IV) particularly include:
ammonium hexachlorostannate $H_8N_2Cl_6Sn$
barium stannate $BaSnO_3$
bismuth stannate $BiSn_2O_7$
lead stannate dihydrate $PbSnO_3*2H_2O$
cadmium stannate $CdSn_2O_4$
calcium stannate $CaSnO_3$
cobalt(II) stannate dihydrate $CoSnO_3*2H_2O$
potassium stannate trihydrate $K_2SnO_3*3H_2O$
copper(II) stannate $CuSnO_3$
lithium hexafluorostannate $Li_2[SnF_6]$
sodium stannate $Na_2SnO_3$(anhydride)
trihydrate and hexahydroxide
strontium stannate $SrSnO_3$
zinc hexahydroxostannate $Zn[Sn(OH)_6]$
zinc stannate $ZnSnO_3$.

Stannates (II) for example include:
sodium stannate $Na_2SnO_2$
calcium stannate(II) $CaSnO_2$.

According to the invention, in particular an aqueous alkaline solution is applied—for example by means of a roll coater or by means of a spray-squeeze treatment or other treatment—onto a galvanized surface before the annealing and hardening process. In this case, very thin layer thicknesses are used, which are 1-5 μm in the aqueous form and are 50-250 nm thick when dry. When stannates are used, the tin coating is 30-90 mg of tin per $m^2$ in the form of $K_2[SnO_3]$.

According to the invention, it has turned out that with a conventional annealing time for sheet metals that are to undergo a hardening, the surface resistance is very low and even with a cyclic corrosion test according to the VDA 233-102 climate change test, only a very low paint infiltration tendency could be observed. Significantly fewer oxides could be optically detected, which is revealed by a silvery color of the annealed sheet. Usually, such a silvery color poses a problem since it indicates a lack of a complete reaction and of a stable $Al_2O_3$ layer. Tests showed that the zinc-iron crystals of the zinc layer had completely reacted. A good formation of phosphate crystals in the phosphating could also be observed. This was not to be expected in this form since according to the prevailing wisdom among experts, tin phosphating exerts a negative influence.

For reasons that are not entirely clear, despite the silvery color, which usually produces a reduction in emissivity, there is even a tendency for somewhat higher heating rates to be achieved than without tin or stannate treatment of the zinc surface. It has not yet been possible to fully explain what the reason for this might be.

By and large, it is not yet possible to say at this time how the tin solution works in detail, but the effect is surprising and absolutely clear.

The invention thus relates to a method for producing hardened steel components, wherein sheet bars are cut out from an alloy-galvanized strip made of a quench-hardenable steel alloy and then the sheet bars are heated to a temperature that produces a structural change to austenite, preferably to a temperature above the respective Ac3 point, wherein the austenitized sheet bars are then conveyed to a press hardening tool in which the sheet bars are hot formed in a single stroke or multiple strokes by means of an upper and lower tool, wherein the formed sheet bar is cooled against the—in particular cooled—tools at a speed above the critical cooling rate so that a martensitic hardening occurs, wherein after the galvanization, preferably hot-dip galvanization, of the steel strip and before the temperature increase for achieving the austenitization, tin is applied to the surface of the strip or sheet bar.

In one embodiment, the tin is applied in ionic form or in metallic form, wherein in ionic form, the tin is applied from an aqueous salt solution and in metallic form, the tin is applied using a CVD or PVD process.

In one embodiment, the tin is applied from an alkaline or acidic solution.

In one embodiment, an aqueous stannate solution is applied, which is adjusted to be alkaline or acidic.

In one embodiment, the tin in the solution is complexed with citric acid.

In one embodiment, an aqueous solution is applied with a layer thickness of 1-5 μm, in particular 1-3 μm, wherein the layer thickness when dry is 50-250 nm, preferably 50-150 nm, particularly 75-125 nm, especially 80-100 nm.

In one embodiment, the tin coating is 30-90 mg tin/$m^2$, particularly 40-80 mg tin/$m^2$, and especially 50-60 mg tin/$m^2$.

In one embodiment, an aqueous solution with a solution concentration of 150-250 g/l $K_2SnO_3*3H_2O$ is used.

In one embodiment, an aqueous solution with 150-250 g/l $K_2SnO_3*3H_2O$ and 15-25 g/l KOH is used.

In one embodiment, a solution is used, which has a pH value of 12.5-13.5.

In one embodiment, a solution is used, which has a pH value of 4-5.5, and in the solution, the tin is complexed with citric acid.

In one embodiment, citric acid is contained in a quantity of 35-40 g/l for complexing the tin, wherein the pH value is 4-5.5.

In one embodiment, the solution concentration is 200 g/l $K_2SnO_3*3H_2O$ with 20 g/l KOH.

In another aspect, the invention relates to a galvanized steel strip coated with 40-80 mg tin/$m^2$.

In one embodiment, the tin is deposited metallically or in ionic form.

In one embodiment, the tin is deposited from a stannate solution or by means of a PVD or CVD process.

In another aspect of the invention, it relates to the use of an above-mentioned steel strip, which is produced with an above-mentioned method, in a method in which a steel sheet is heated to achieve the austenitization and then formed and hardened, in particular quench-hardened, at a cooling rate above the critical cooling rate.

BRIEF DESCRIPTION OF THE DRAWINGS

The invention will be explained by way of example based on the drawings. In the drawings:

FIG. 8 is the comparison of two steel sheets after the annealing, shown without conditioning on the left and shown with conditioning according to the invention on the right;

FIG. 12 shows the electrical resistance of the sheet surface in surfaces treated according to the invention;

FIG. 13 shows the paint infiltration in surfaces conditioned according to the invention after six weeks according to the VDA test.

DETAILED DESCRIPTION OF THE INVENTION

According to the invention, the surface of a galvanized sheet metal, in particular sheet steel, which is formed and hardened in one step in a press hardening process, is conditioned with tin or stannates; the conditioning with stannates will be discussed below.

The stannates that can be used have already been listed above; a potassium stannate solution is particularly suitable, wherein basically, one approach is to apply stannate or tin to the surface in ionic form.

In this connection, both alkaline and acidic solutions can be used and in particular, solutions in which the tin is complexed can be used.

In particular, the aim is to produce an aqueous layer thickness of 1-5 μm, with a dry layer thickness of 50-250 nm, preferably 50-150 nm, and a tin coating of 30-90 mg tin/$m^2$ in the form of $K_2[SnO_3]$.

Figure 4:
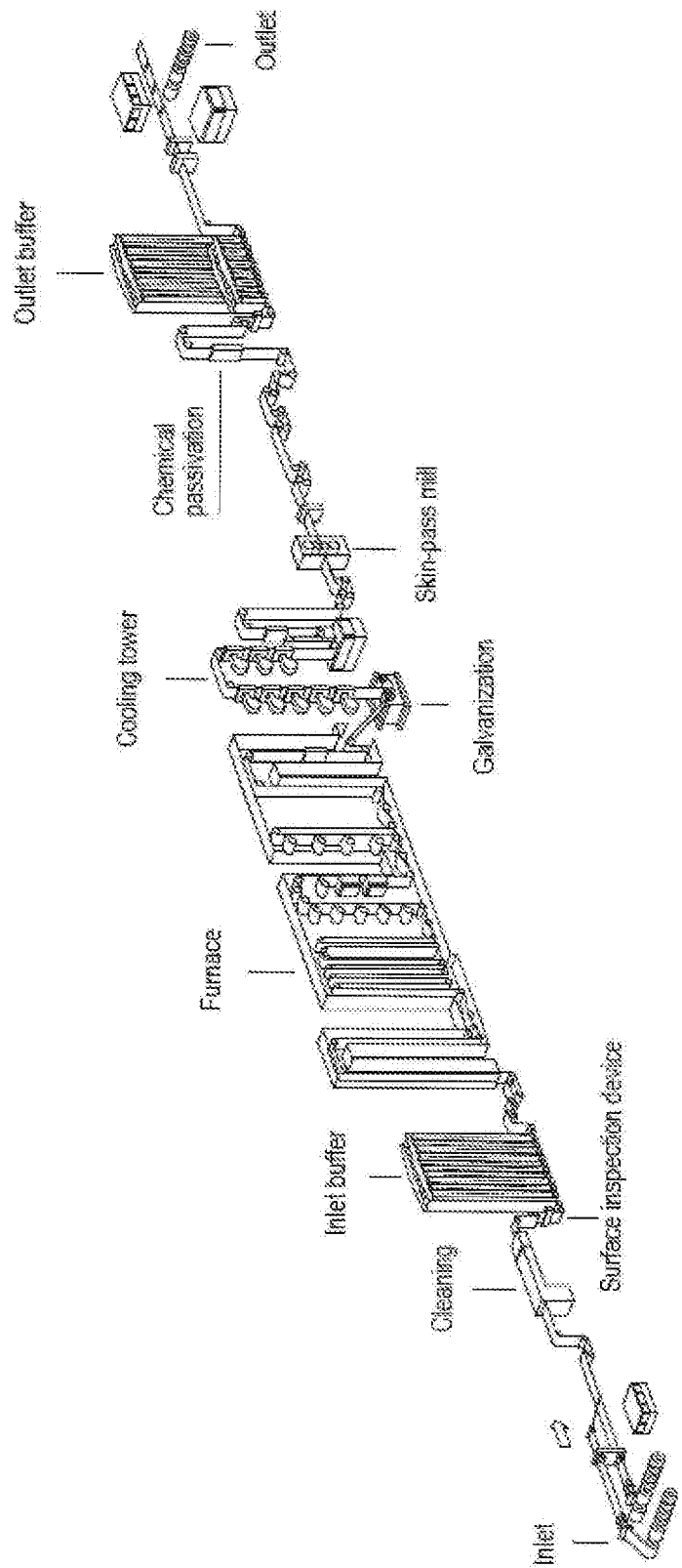
FIG. 4 shows a line layout of a hot-dip galvanization line according to the prior art.
Figure 5:
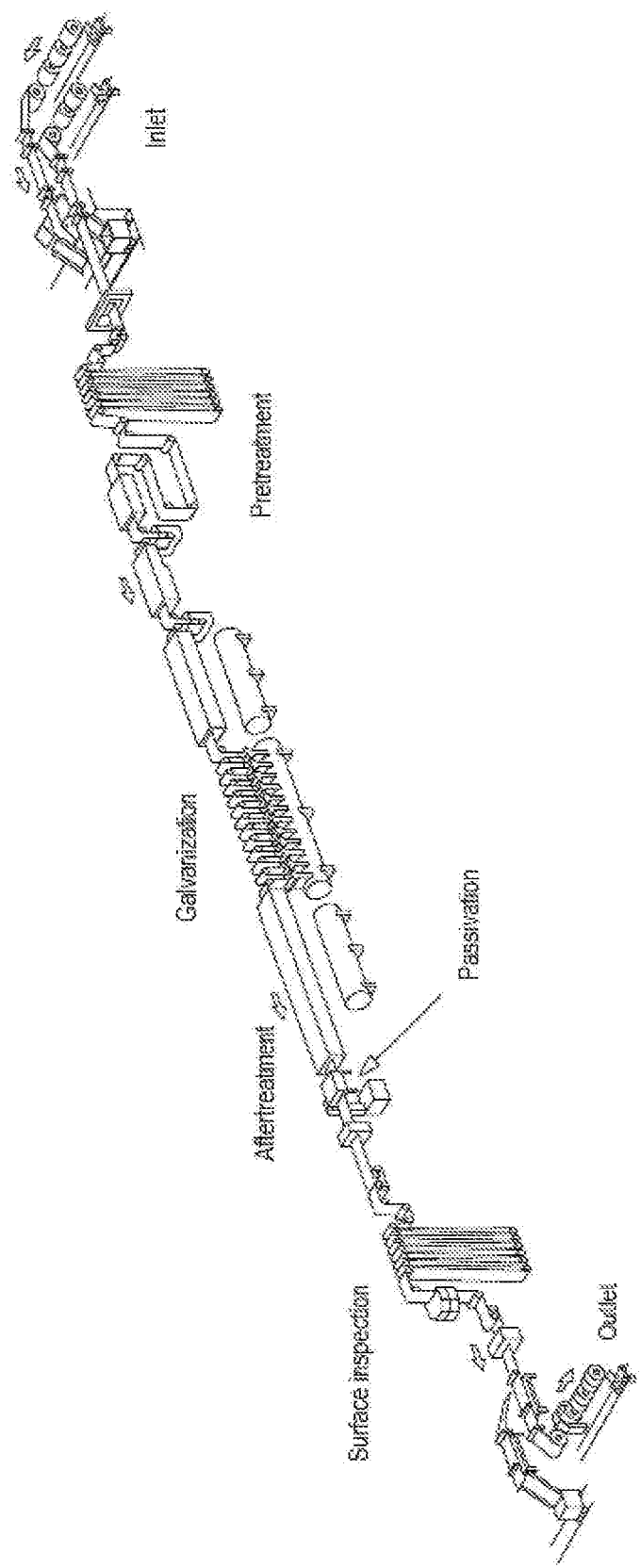
FIG. 5 shows a line layout of an electrolytic galvanization line according to the prior art.

FIGS. 4 and 5 show a hot-dip galvanization line or electrolytic galvanization line. In this case, the application of the stannate can preferably be carried out in the vicinity of the chemical passivation (in FIG. 4) or "passivation" station (in FIG. 5).

Figure 1:
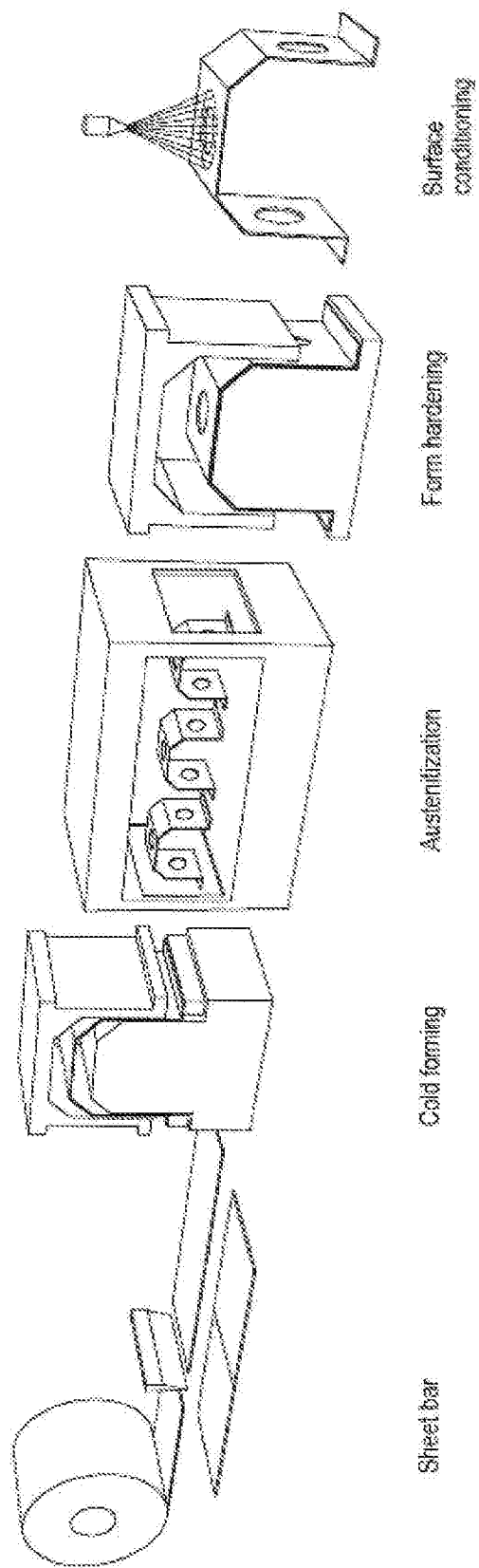
FIG. 1 shows the production path in the form hardening process or phs-ultraform® process according to the prior art.
Figure 2:
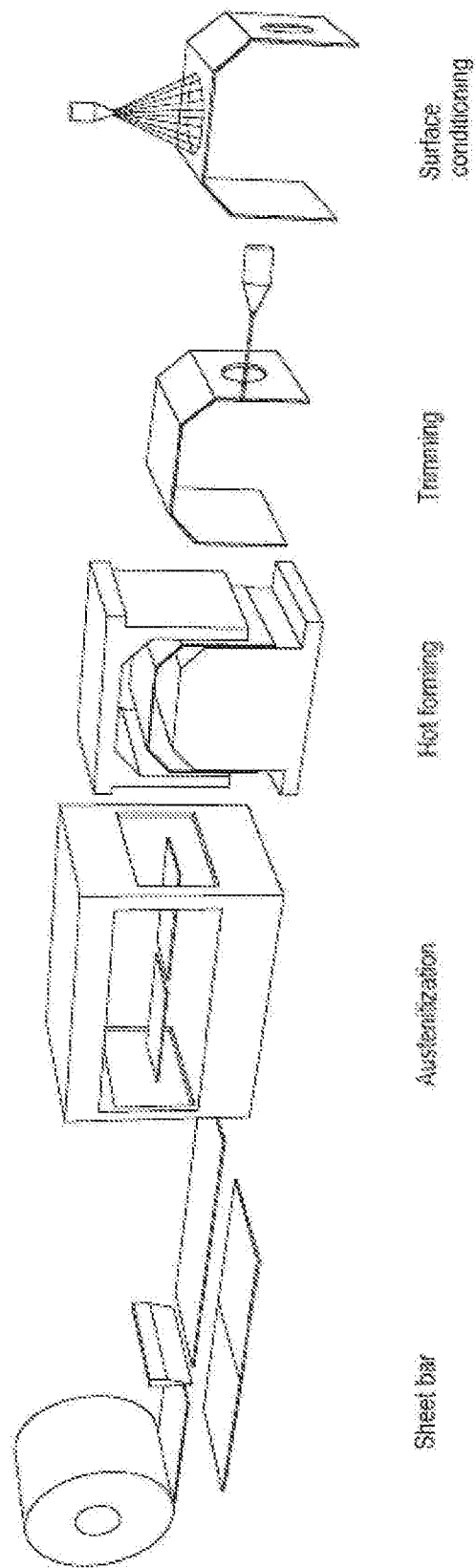
FIG. 2 shows the production path in the hot-forming process, press hardening, or phs-directform® process according to the prior art.
Figure 3:
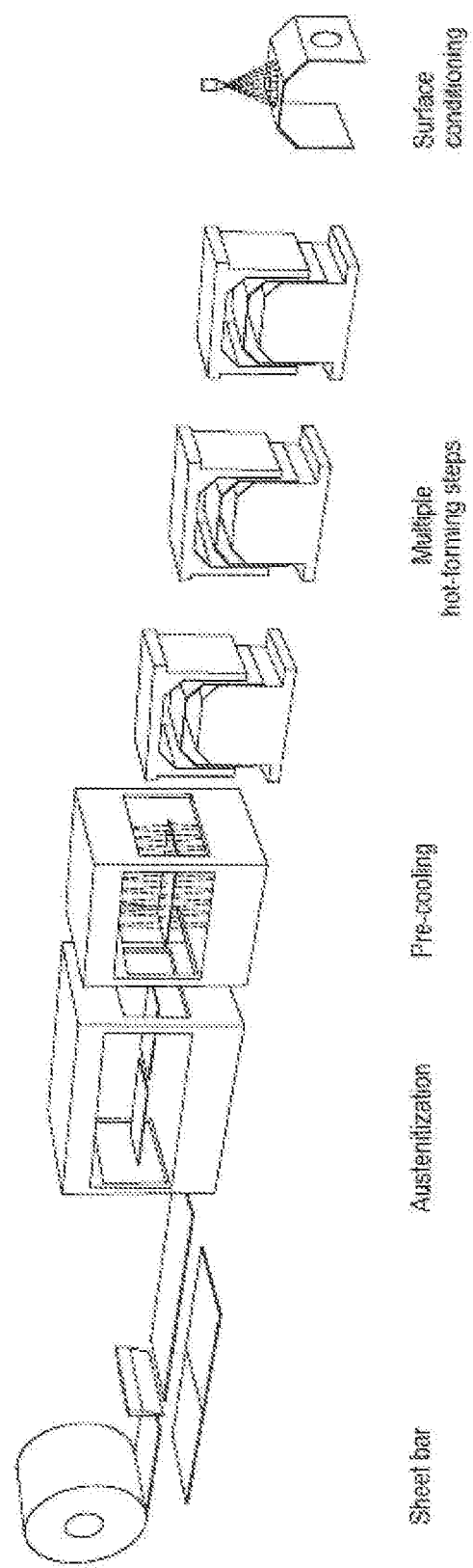
FIG. 3 shows the production path in a variant of the multi-step hot-forming process, multi-step press hardening, or phs-multiform® process according to the prior art.

FIGS. 1 to 3 show conventional methods in which a galvanized sheet steel whose zinc layer contains an element with an affinity for oxygen, for example aluminum, either is austenitized before the forming or is austenitized after the forming and is respectively quench-hardened in a press. This corresponds to the phs-ultraform® process (FIG. 1), wherein after a cold forming, the formed part is then austenitized above Ac3 and then form-hardened. FIG. 2 shows the phs-directform® process in which first, the sheet bar is austenitized, then formed in the hot state, and then the trimming is performed. FIG. 3 shows a variant of this, the so-called phs-multiform® process, in which after the austenitization and an optional pre-cooling, particularly to a temperature of 450° C. to 650° C., a multi-step process is carried out with several forming steps and/or cutting and stamping procedures that are subsumed under the term "hot forming steps". After the hardening, the surface of the sheets that have been heat treated in this way has a layer particularly composed of aluminum oxide and zinc oxide, which is preferably cleaned.

According to the invention, it has been discovered that the conditioning of the surface with very small quantities of tin clearly has such a powerful influence on the formation of the oxide layer that it either does not occur in this form or is conditioned to such a degree that it does not have to be cleaned.

Figure 6:
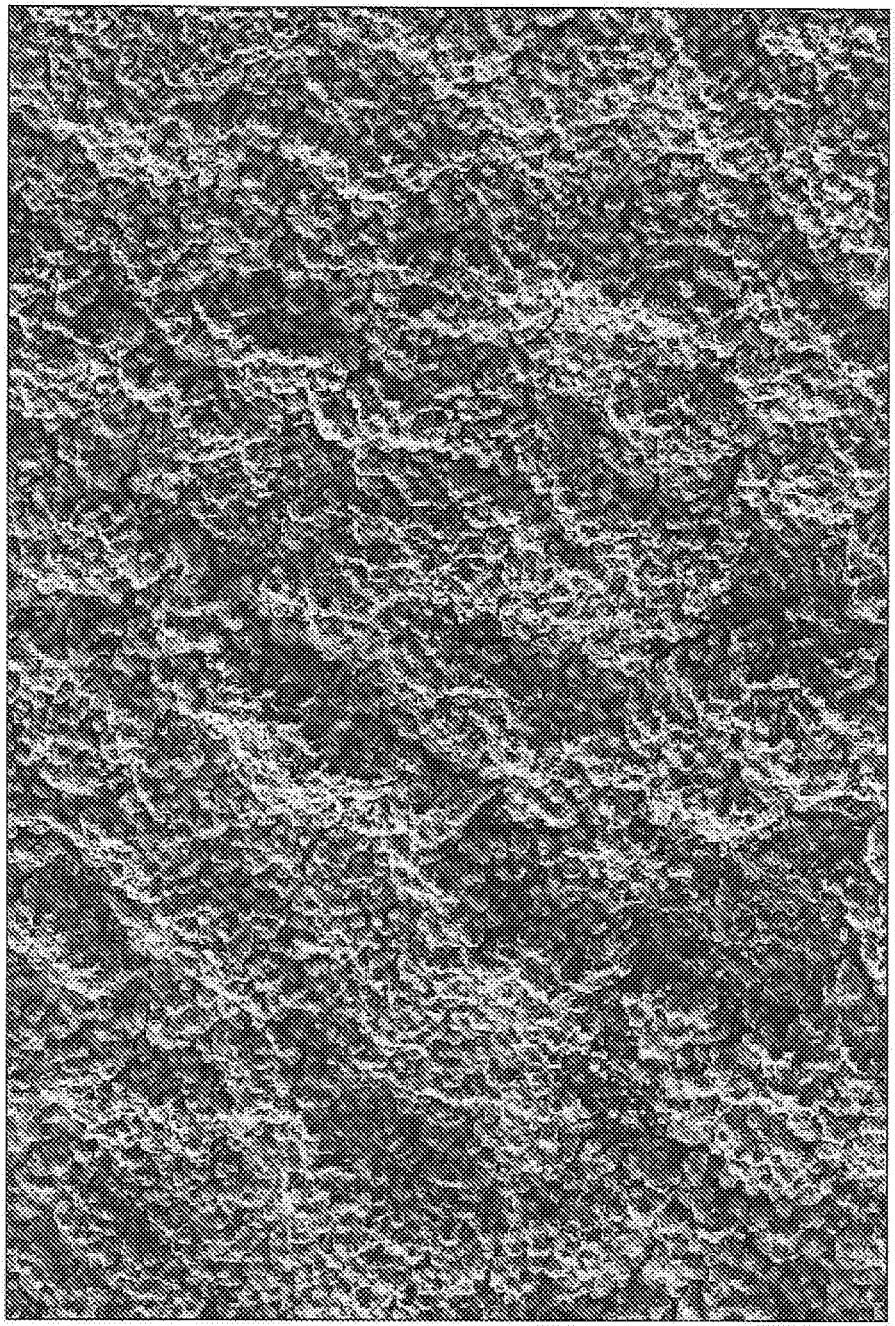
FIG. 6 shows an electron microscope image of the surface after the annealing without conditioning (prior art)

A conventionally produced hardened steel sheet bar has a greenish-beige appearance on the surface, which is caused by an increased formation of zinc oxides and manganese oxides. This is shown in FIG. 6.

Figure 7:
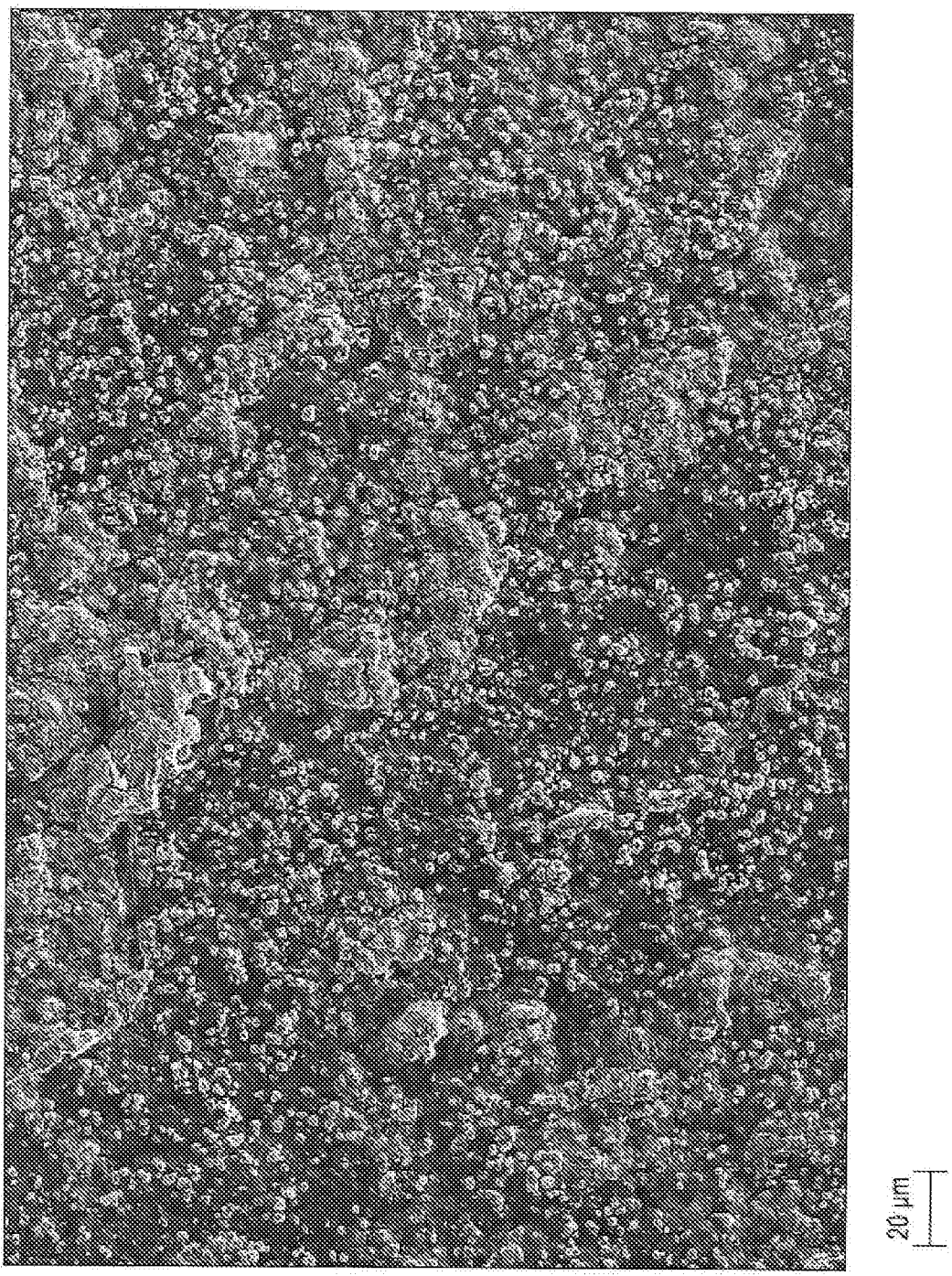
FIG. 7 shows an electron microscope image of the surface that has been conditioned according to the invention after the annealing.

In a conditioning with a stannate solution, the sheet exhibits a silvery surface (FIG. 7) chiefly consisting of zinc oxides or tin oxides.

Whereas with conventional methods, silvery surfaces indicate the lack of a complete reaction of the zinc layer with the underlying steel, this is not the case with the invention. Measurements have shown that the zinc layer has completely reacted in the same way. However, small amounts of aluminum oxides have formed on the surface, wherein the surface resistance as a measure for the spot-weldability and the paint infiltration is very low.

FIG. 8 once again shows a comparison of a hardened galvanized steel sheet according to the prior art to one that has been treated according to the invention. Both sheets, each of the 22MnB5 grade with a zinc layer coating of 140 g/m² (on both sides), were annealed for 45 seconds at a temperature above Ac3. The appearance of the sheet according to the prior art is significantly darker.

Figure 9:
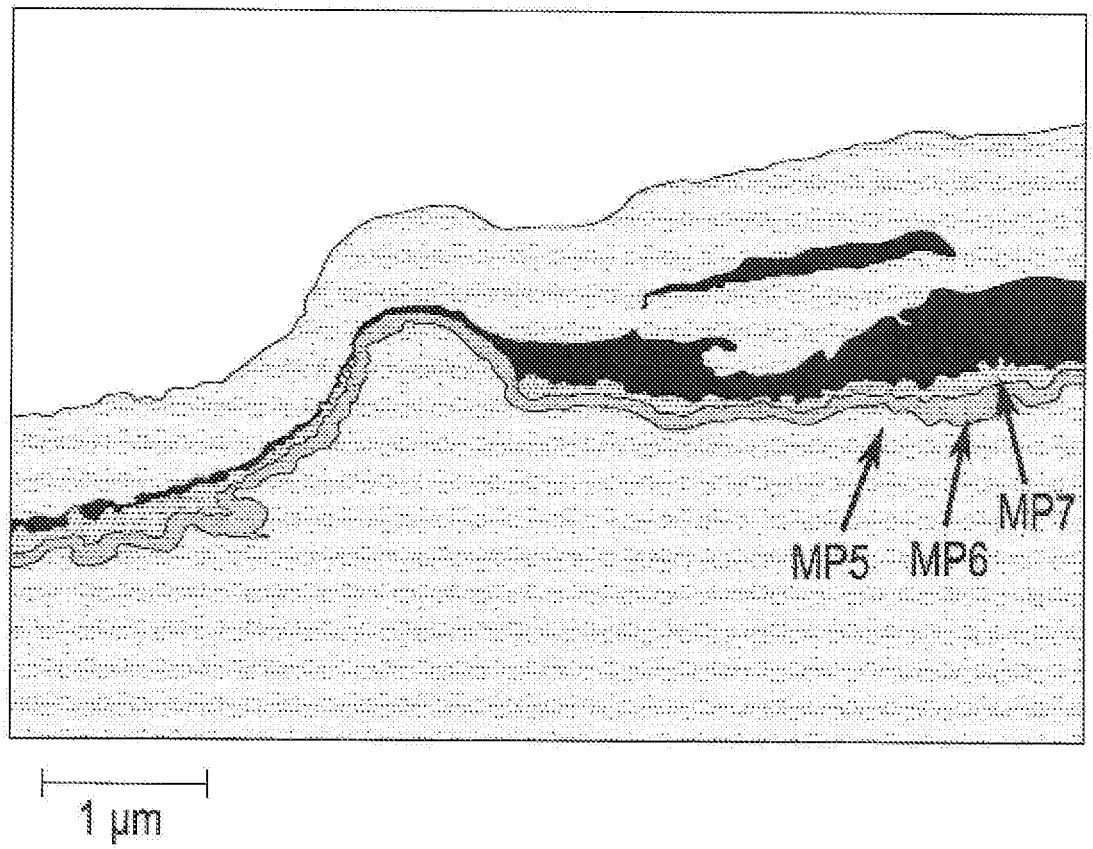
FIG. 9 shows a polished micrograph of the steel sheet that has been conditioned according to the invention, with the element distribution at four different measuring points.

FIG. 9 shows a surface that is embodied and conditioned according to the invention in a sectional electron microscope image, wherein an alkaline solution of potassium stannate with potassium hydroxide was applied with a roll coater before the heat treatment. In this case, the steel grade 340LAD with a zinc layer of 180 g/m² was annealed at 870° C. for 200 seconds. The layers above measuring point 7 (MP7) are preparation-related CSP redeposits and are therefore of no significance. It is clear that the lighter-colored layer at the level of MP7 represents the Sn/Zn oxide; this is also substantiated by the constituents of MP7, which exhibit significantly high values of Sn. The layer is very thin and is present over virtually the entire surface of the strip. Under this is a darker layer composed of Al oxide (MP6), which is likewise present over virtually the entire surface of the strip. Under this in turn is the reacted Zn/Fe layer, some of which can have slightly oxidized regions (at MP4, which is not shown in FIG. 9, however).

At different measuring points, element measurements were performed, which indicate the presence of the above-described tin coating.

The concentration of the solution that is used for the conditioning by means of roll coating is selected so that with a wet film of 1 μm, from 50-60 mg tin/m² are deposited. During the annealing, a layer applied to this produces a modification of the oxide layer that forms so that a mechanical cleaning by means of a centrifugal wheel or other mechanical methods is no longer necessary.

A solution that produces a conditioning according to the invention has a solution concentration of 180-220 g/l $K_2SnO_3 \cdot 3H_2O$.

In order to increase the base capacity, the solution can have 15-25 g/l KOH added to it so that a pH value of approx. 13, i.e. 12.5-13.5 is produced.

Since in practical operation, acidic solutions are usually used readily, and since stannate solutions often tend to form precipitates during acidification, as an alternative to KOH, the tin can be suitably complexed to such an extent that a clear precipitate-free solution is obtained by adding citric acid in a quantity of 30-50 g/l, which results in a pH value of approx. 4.8.

Figure 10:
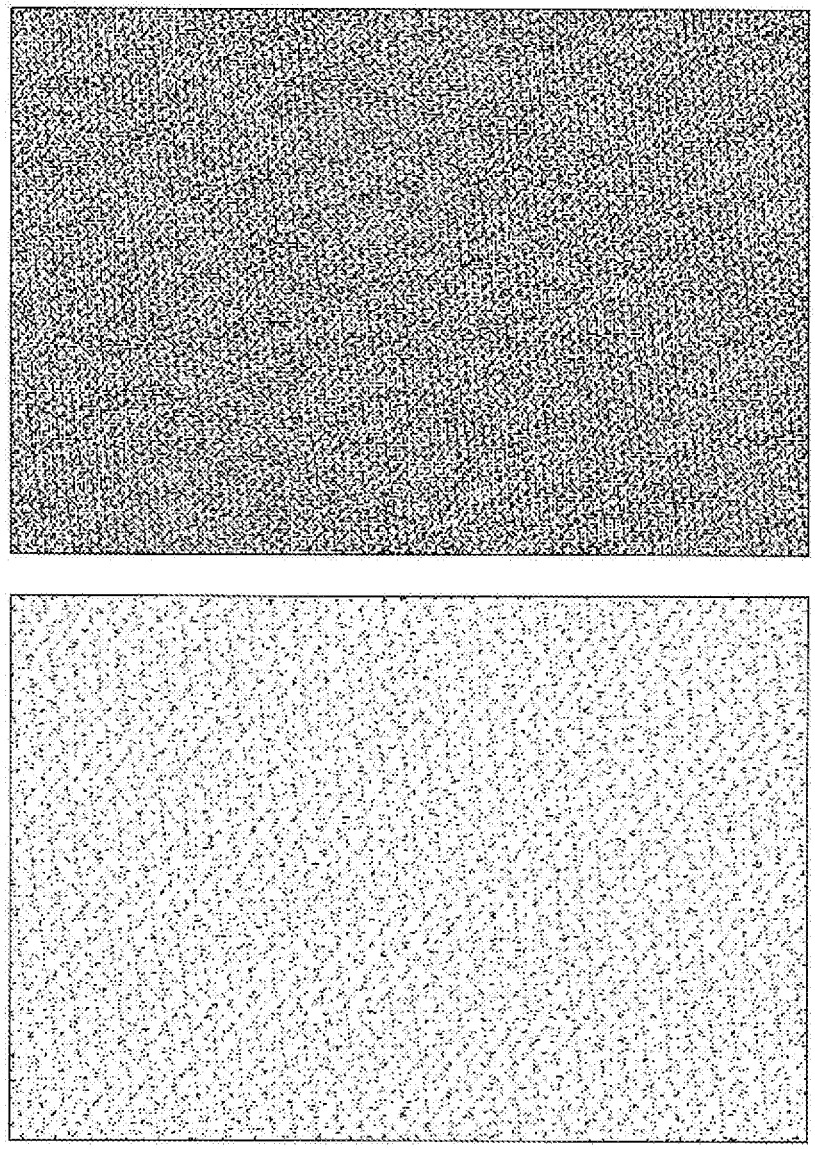
FIG. 10 shows the surface of a galvanized sheet steel after the annealing with an annealing time of 45 seconds and 200 seconds.

FIG. 10 once again shows the surface of a conventional sheet that is not conditioned according to the invention for a different steel grade (22MnB5 with a zinc layer Z140-140 g/m²) after 45 seconds and 200 seconds of annealing time at 870° C. Both sheets exhibit the above-mentioned beige-green color.

Figure 11:
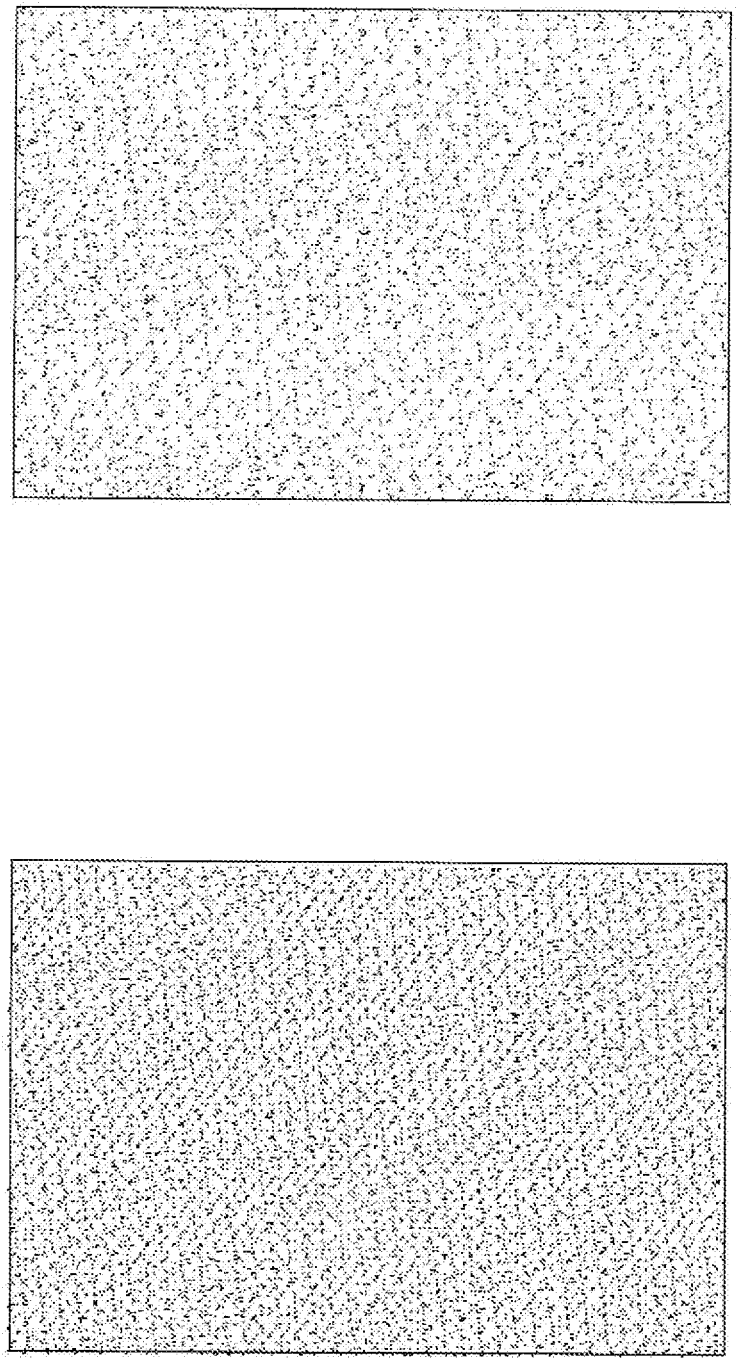
FIG. 11 shows the surface of the sheet steel after the annealing with a surface conditioning according to the invention after 45 seconds and 200 seconds.

FIG. 11 shows the surfaces of two sheets (once again 22MnB5 with a zinc layer Z140-140 g/m²), which were conditioned according to the invention, after 45 seconds and 200 seconds of annealing time at 870° C. (i.e. above Ac3). The differences in the surface color are clearly visible.

FIG. 12 shows the corresponding resistance results for different steel grades and annealing times respectively at 870° C., which demonstrate that with the surface conditioning according to the invention, a very low surface resistance is achieved, which gives rise to the expectation of a very good weldability. The third grade 20MnB8 was coated with a zinc-iron layer, i.e. a so-called galvannealed layer of 180 g/m².

Also with regard to corrosion, the surface conditioning according to the invention achieves an advantage when it comes to paint infiltration because, as the results in FIG. 13 demonstrate, the paint infiltration results are so good that a cathodic immersion paint applied to the sheets without mechanical cleaning has infiltrated only slightly and not to a greater degree than in other sheets. To demonstrate this, the VDA 233-102 climate change test was conducted and in this case, the paint infiltration in mm and also the respective cross-hatch adhesion value in a cross-cut according to DIN EN ISO 16276-2 were determined before and after the above-mentioned corrosion test according to VDA 233-102. The scale here is from 0 (very good) to 5 (total delamination). In this case, it is clear that the value before and after the test was usually 0, in other words outstanding. Sometimes, small regions flaked off, which resulted in values of 1 and sometimes 2.

The conditioning according to the invention has been presented particularly in conjunction with stannates, but titanates, oxalates, and zirconates also react in essentially the same way. One can therefore assume that they are effective in the same way, particularly the corresponding tin compounds.

But tin appears to be particularly effective, which is why the surface conditioning is also successful if the tin is in metallic form. But the deposition of the tin onto the surface with the aid of stannates, i.e. in ionic form, has the advantage that the application can be carried out in a comparatively simple way using a roll coating or dip-squeeze method.

Naturally, all other methods with which liquid ionic solutions can be applied to a surface are also suitable.

The deposition of metallic tin is nevertheless conceivable and is possible, for example, by means of a CVD or PVD process.

The application can take place inline on the strip before it is cut into individual sheet bars. The sheet bars cut out from the strip can also be coated in a corresponding way.

The sheet bars are then heated to a temperature that produces a structural change to austenite. The austenitized sheet bars are then conveyed to a press hardening tool in which the sheet bar is formed in a single stroke or multiple strokes by means of an upper and lower tool. This can be carried out in the above-mentioned phs-directform® or phs-multiform® process with multiple stamping and/or trimming operations and with or without pre-cooling. Due to the placement of the material of the formed sheet bar against the—in particular cooled—tools, the heat is removed from the steel material so quickly that a martensitic hardening occurs.

The invention has the advantage that by means of it, the surface of a sheet steel provided for form hardening or press hardening is successfully conditioned so that it is possible to dispense with a mechanical final cleaning for removing oxidic surface layers so that sheets of this kind can be processed in the same way as hot-dip aluminized sheets, for example, but with the advantage that a very high cathodic corrosion protection effect is achieved in comparison to hot-dip aluminized sheets.

The invention claimed is:

1. A method for producing hardened steel components, comprising the steps of:
   cutting a steel sheet bar from a galvanized steel strip including a hardenable steel alloy having a zinc or zinc-based alloy coating;
   heating the steel sheet bar to a temperature that is above an Ac3 temperature of the steel alloy and produces a structural change in the steel alloy to austenite and formation of an oxide layer on the zinc or zinc-based alloy coating, to produce the austenitized steel sheet bar;
   conveying the austenitized steel sheet bar to a press hardening tool that includes an upper tool and a lower tool;
   hot forming the austenitized steel sheet bar in a single stroke or multiple strokes using the upper tool and the lower tool;
   cooling the austenitized steel sheet bar at a speed above a critical cooling rate of the steel alloy to cause a martensitic hardening of the steel sheet bar to form a finished hardened steel component without mechanically cleaning the oxide layer; and
   before heating the steel sheet bar to the temperature that is above an Ac3 temperature of the steel alloy and produces the structural change, applying tin to a surface of at least one of the galvanized steel strip and the steel sheet bar in an amount of about 30 to about 90 mg tin per square meter of the surface;
   wherein the oxide layer includes zinc and tin.

2. The method according to claim 1, wherein the tin is applied in an ionic form from an aqueous salt solution.

3. The method according to claim 1, wherein the tin is applied using a chemical vapor deposition (CVD) or a physical vapor deposition (PVD) process.

4. The method according to claim 1, wherein the tin is applied from an alkaline or acidic solution.

5. The method according to claim 1, wherein the tin is applied using an alkaline or acidic aqueous stannate solution.

6. The method according to claim 1, wherein the tin is complexed with citric acid and is applied from a solution.

7. The method according to claim 1, wherein the tin is applied from a solution in a layer having a wet thickness of about 1 to about 5 microns and a dry thickness of about 50 to about 150 nanometers.

8. The method according to claim 1, wherein the tin is applied in an amount of about 40 to about 80 mg tin per square meter of the surface.

9. The method according to claim 1, wherein the tin is applied from a solution comprising $K_2SnO_3*3H_2O$, present in a concentration of about 150 to about 250 grams/liter.

10. The method according to claim 9, wherein the solution further comprises KOH in a concentration of about 15 to about 25 grams per liter.

11. The method according to claim 1, wherein the tin is applied from a solution having a pH value of about 12.5 to about 13.5.

12. The method according to claim 1, wherein the tin is complexed with citric acid and is applied from a solution having a pH value of about 4 to about 5.5.

13. The method according to claim 12, wherein the solution comprises the citric acid in a concentration of about 35 to about 40 g/l.

14. The method according to claim 1, wherein the tin is applied from a solution comprising about 200 g/l $K_2SnO_3*3H_2O$ and about 20 g/l KOH.

15. The method of claim 1, wherein the zinc or zinc-based alloy coating comprises at least about 98% by weight zinc.

16. A method of using a galvanized steel strip formed from a hardenable steel alloy and having a zinc or zinc-based alloy coating and an oxide layer on the zinc or zinc-based alloy coating, comprising the steps of:
   cutting the galvanized steel strip to form a steel sheet bar;
   applying a tin coating to a surface of at least one of the galvanized steel strip and the sheet bar, resulting in a tin-coated steel sheet bar in an amount of about 30 to about 90 mg tin per square meter of the surface;
   heating the tin-coated steel sheet bar to a temperature that is above an Ac3 temperature of the steel alloy and produces austenitization of the steel alloy and formation of the oxide layer, yielding an austenitized tin-coated steel sheet bar;
   conveying the austenitized tin-coated steel sheet bar to a press hardening tool that includes an upper tool and a lower tool;
   hot forming the austenitized tin-coated steel sheet bar in a single stroke or multiple strokes using the upper tool and the lower tool; and
   cooling the austenitized tin-coated steel sheet bar at a speed above a critical cooling rate of the steel alloy to cause a martensitic hardening of the steel sheet bar and form a finished hardened steel component;
   wherein the method is performed without mechanically cleaning the oxide layer and the oxide layer includes zinc and tin.

17. The method according to claim 16, wherein the tin is applied in an ionic form from an aqueous salt solution.

18. The method according to claim 16, wherein the tin is applied using an alkaline or acidic aqueous stannate solution.

19. The method according to claim 16, wherein the tin is complexed with citric acid and is applied from a solution.

20. The method according to claim 16, wherein the tin is applied from a solution in a layer having a wet thickness of about 1 to about 5 microns and a dry thickness of about 50 to about 150 nanometers.

21. The method according to claim 16, wherein the tin is applied in an amount of about 40 to about 80 mg tin per square meter.

22. The method of claim 16, wherein the zinc or zinc-based alloy coating comprises at least about 98% by weight zinc.

\* \* \* \* \*